US011247660B2

(12) United States Patent
Obata et al.

(10) Patent No.: US 11,247,660 B2
(45) Date of Patent: Feb. 15, 2022

(54) TOTAL DISTANCE TO EMPTY INFORMING DEVICE PROVIDED IN HYBRID VEHICLE

(71) Applicant: NISSAN MOTOR CO., LTD., Yokohama (JP)

(72) Inventors: Takeaki Obata, Kanagawa (JP); Kazuhide Shimada, Kanagawa (JP); Eisuke Fukushima, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 85 days.

(21) Appl. No.: 16/636,367

(22) PCT Filed: Aug. 10, 2017

(86) PCT No.: PCT/JP2017/029174
§ 371 (c)(1),
(2) Date: Feb. 4, 2020

(87) PCT Pub. No.: WO2019/030910
PCT Pub. Date: Feb. 14, 2019

(65) Prior Publication Data
US 2020/0164863 A1    May 28, 2020

(51) Int. Cl.
*B60W 20/15*     (2016.01)
*B60W 20/11*     (2016.01)
(Continued)

(52) U.S. Cl.
CPC ............ *B60W 20/15* (2016.01); *B60W 10/24* (2013.01); *B60W 20/11* (2016.01);
(Continued)

(58) Field of Classification Search
CPC ...... B60W 20/15; B60W 20/11; B60W 10/24; B60W 2530/209; B60W 2050/0039;
(Continued)

(56) References Cited

U.S. PATENT DOCUMENTS

2010/0167142 A1    7/2010  Saito
2011/0276206 A1   11/2011  Tofukuji et al.
(Continued)

FOREIGN PATENT DOCUMENTS

DE    10 2013 013 540 A1    2/2015
EP        1 055 545 A2      11/2000
(Continued)

*Primary Examiner* — Marthe Y Marc-Coleman
(74) *Attorney, Agent, or Firm* — Foley & Lardner LLP

(57) ABSTRACT

According to a control method for a hybrid vehicle that is caused to run by a drive motor as a load being supplied with electric power of a battery and electric power generated by an electric generator, a total distance to empty is calculated on the basis of a shortage of a generating power output of the electric generator with respect to a required running power output and an amount of charge remaining in the battery. Specifically, a length of time for which the shortage of the generating power output of the electric generator with respect to the required running power output is covered by the amount of charge remaining in the battery is calculated, and a distance that the hybrid vehicle can run for this length of time is set as a total distance to empty.

11 Claims, 9 Drawing Sheets

(51) Int. Cl.
*B60W 10/24* (2006.01)
*B60W 50/00* (2006.01)

(52) U.S. Cl.
CPC ............... *B60W 2050/0039* (2013.01); *B60W 2510/244* (2013.01); *B60W 2530/18* (2013.01); *B60W 2530/209* (2020.02); *B60W 2556/10* (2020.02)

(58) Field of Classification Search
CPC ....... B60W 2510/244; B60W 2530/14; B60W 2530/18; Y02E 60/50; Y02E 60/10; B60K 6/32; H01M 16/006; H01M 10/48; H01M 10/44; H01M 8/0494; H01M 8/04619
See application file for complete search history.

(56) References Cited

U.S. PATENT DOCUMENTS

| | | | |
|---|---|---|---|
| 2012/0116620 A1* | 5/2012 | Wang | B60L 3/12 |
| | | | 701/22 |
| 2012/0143413 A1* | 6/2012 | Cho | B60L 15/2045 |
| | | | 701/22 |
| 2013/0073113 A1 | 3/2013 | Wang et al. | |
| 2013/0166125 A1* | 6/2013 | Yamamoto | B60L 50/16 |
| | | | 701/22 |
| 2015/0369619 A1 | 12/2015 | Kim et al. | |
| 2016/0086390 A1* | 3/2016 | Berkobin | G07C 5/0808 |
| | | | 701/1 |

FOREIGN PATENT DOCUMENTS

| | | |
|---|---|---|
| JP | 2004-63205 A | 2/2004 |
| JP | 2012-101616 A | 5/2012 |
| JP | 2012-253948 A | 12/2012 |
| JP | 2013-072804 A | 4/2013 |
| WO | WO 2011/114486 A1 | 9/2011 |

* cited by examiner

AMOUNT OF OUTPUTTABLE ELECTRIC POWER OF BATTERY=10kWh
AMOUNT OF REMAINING FUEL ELECTRIC POWER=80kWh

| REQUIRED POWER OUTPUT kW | AVERAGE VEHICLE SPEED km/h | MAXIMUM POWER OUTPUT OF SOFC kW | TOTAL DISTANCE TO EMPTY (COMPARATIVE EXAMPLE) km | TOTAL DISTANCE TO EMPTY km | ERROR km | ERROR % |
|---|---|---|---|---|---|---|
| 20 | 100 | 15 | 450 | 200 | 250 | 125 |
| 25 | 120 | 15 | 432 | 120 | 312 | 260 |
| 30 | 140 | 15 | 430 | 93.3 | 326.7 | 350 |

FIG. 5

AMOUNT OF OUTPUTTABLE ELECTRIC POWER OF BATTERY=10kWh
AMOUNT OF REMAINING FUEL ELECTRIC POWER=40kWh

| REQUIRED POWER OUTPUT kW | AVERAGE VEHICLE SPEED km/h | MAXIMUM POWER OUTPUT OF SOFC kW | TOTAL DISTANCE TO EMPTY (COMPARATIVE EXAMPLE) km | TOTAL DISTANCE TO EMPTY km | ERROR km | ERROR % |
|---|---|---|---|---|---|---|
| 20 | 100 | 15 | 250 | 200 | 50 | 25 |
| 25 | 120 | 15 | 240 | 120 | 120 | 100 |
| 30 | 140 | 15 | 233.3 | 93.3 | 140 | 150 |

FIG. 6

AMOUNT OF OUTPUTTABLE ELECTRIC POWER OF BATTERY=10kWh
AMOUNT OF REMAINING FUEL ELECTRIC POWER=15kWh

| REQUIRED POWER OUTPUT kW | AVERAGE VEHICLE SPEED km/h | MAXIMUM POWER OUTPUT OF SOFC kW | SECOND TOTAL DISTANCE TO EMPTY km | FIRST TOTAL DISTANCE TO EMPTY km | ERROR km | ERROR % |
|---|---|---|---|---|---|---|
| 20 | 100 | 15 | 125 | 200 | -75 | -37.5 |
| 25 | 120 | 15 | 100 | 120 | -20 | -16.6 |
| 30 | 140 | 15 | 83.3 | 93.3 | -10 | -10.7 |

FIG. 8

TOTAL DISTANCE TO EMPTY INFORMING DEVICE PROVIDED IN HYBRID VEHICLE

TECHNICAL FIELD

The present invention relates to control of a hybrid vehicle that supplies electric power of a battery and electric power generated by an electric generator to a load.

BACKGROUND ART

There is conventionally known a hybrid vehicle that is an electric vehicle, which is caused to run by a motor as a load being driven by electric power of a battery, added with, as a so-called range extender, an electric generator which charges the battery or directly supplies electric power to the motor. For example, JP2012-101616 A has disclosed a series hybrid vehicle with an electric generator driven by an internal-combustion engine. Then, in the above-mentioned patent document, a value obtained by adding a distance to empty calculated on the basis of a current amount of charge remaining in a battery and a distance to empty calculated on the basis of electric power obtained by using all the amount of fuel remaining in a fuel tank to drive the internal-combustion engine to generate is set as a total distance to empty.

SUMMARY OF INVENTION

Incidentally, in a series hybrid vehicle, if a battery has run out of power, a motor is directly driven by electric power generated by an electric generator. Therefore, in a case where a generating power output of the electric generator is lower than a required running power output, if electric power of the battery has been used up, the vehicle is unable to run according to a driver's requirement even if there is still some fuel left for driving the electric generator. For example, in a case where the generating power output of the electric generator is lower than a required running power output on a high-load drive such as a case of running on an expressway, it takes more than the electric generator to generate a power output according to the high-load drive; therefore, after electric power of the battery has been used up, the vehicle cannot continue the high-load drive. Furthermore, there is a case that the generating power output of the electric generator is limited during cooling operation or something, and, as a result, becomes lower than the required running power output.

As described above, in a case where the generating power output of the electric generator is lower than the required running power output, a distance that the vehicle can continue running according to the required running power output depends on an amount of charge remaining in the battery. Therefore, a distance for which the required running power output can be actually continued is shorter than a total distance to empty obtained, as in the patent document described above, by adding a distance to empty based on an amount of charge remaining in the battery and a distance to empty based on a remaining amount of fuel for driving the electric generator. Thus, if the total distance to empty calculated by the computation method of the above-described patent document is indicated to a driver, the running power output drops at the timing the driver has not anticipated, which may give the driver a sense of discomfort.

Accordingly, the present invention is intended to provide a method and a device of calculating an actual distance to empty more accurately.

According to one embodiment of this invention, a control method for a hybrid vehicle that supplies electric power of a battery and electric power generated by an electric generator to a load, the control method comprises performing calculation of a total distance to empty based on a shortage of a generating power output of the electric generator with respect to a required running power output and an amount of charge remaining in the battery.

BRIEF DESCRIPTION OF DRAWINGS

FIG. 5 is a first diagram showing a result of a total distance to empty computation.

FIG. 6 is a second diagram showing a result of a total distance to empty computation.

FIG. 8 is a third diagram showing a result of a total distance to empty computation.

DESCRIPTION OF EMBODIMENTS

Embodiments of the present invention are described below with reference to accompanying drawings.

First Embodiment

Figure 1:
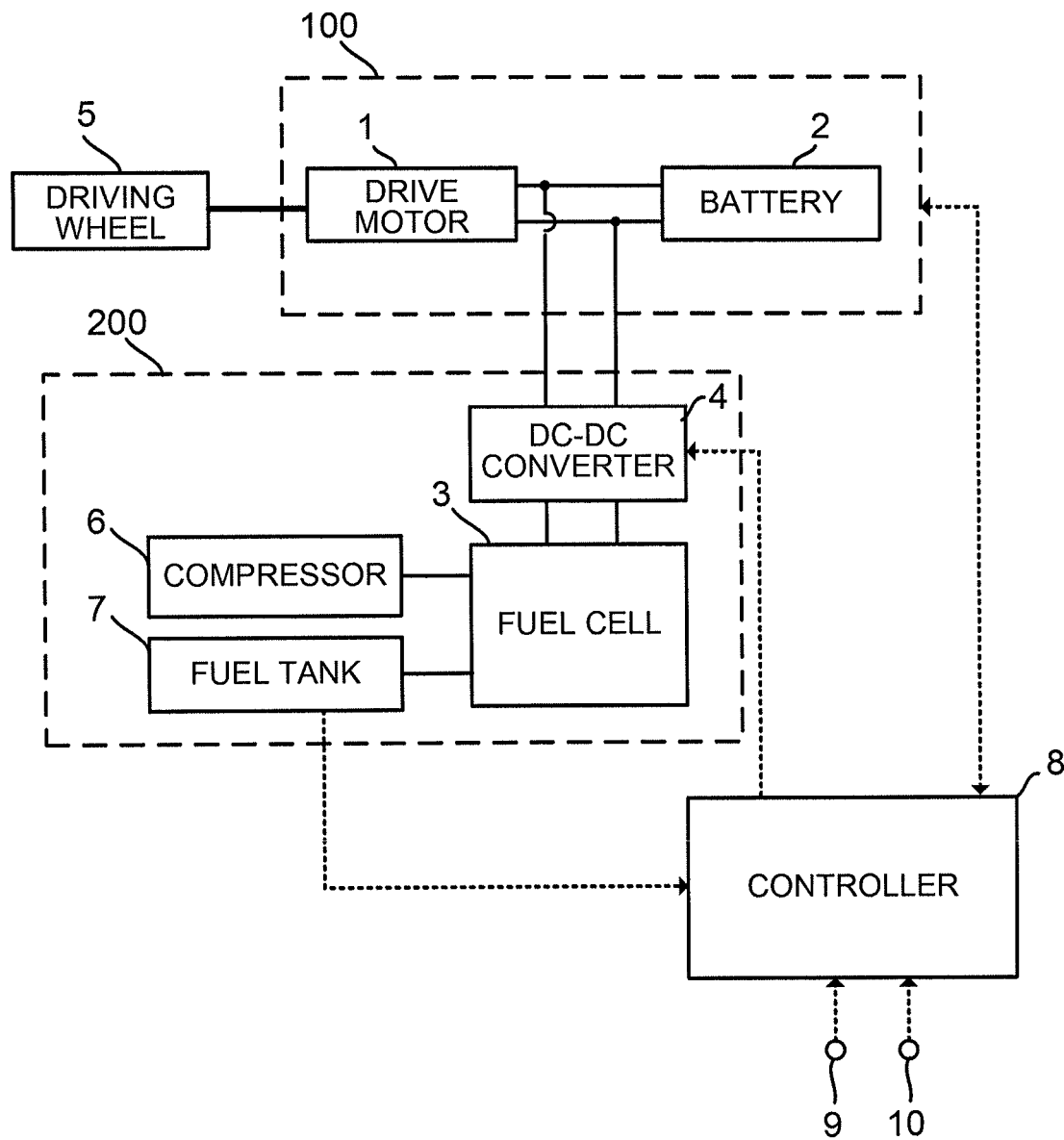
FIG. 1 is a system configuration diagram of a hybrid vehicle.

FIG. 1 is a system configuration diagram of a hybrid vehicle to which a first embodiment of the present invention is applied. This hybrid vehicle is a so-called series hybrid vehicle that is caused to run by a drive motor 1 as a load being supplied with electric power of a battery and electric power generated by an electric generator.

This hybrid vehicle includes an external load 100 that includes the drive motor 1 and a battery 2, a fuel cell system 200 as an electric generator, and a controller 8.

The fuel cell system 200 includes a fuel cell stack 3, a compressor 6 that supplies cathode gas to the fuel cell stack 3, a fuel tank 7 in which fuel to be supplied to the fuel cell stack 3 is stored, and a DC-DC converter 4 that boosts electric power generated by the fuel cell stack 3.

The fuel cell stack 3 is a solid oxide fuel cell (SOFC).

In the fuel tank 7, fuel for reforming made from a liquid that is, for example, a mixture of ethanol and water is stored. It is to be noted that the fuel cell system 200 in FIG. 1 is a simplified one that a reformer, a fuel pump, an evaporator, a heat exchanger, etc. are omitted.

The DC-DC converter 4 is an electric power regulator that boosts the voltage of the fuel cell stack 3 with respect to respective voltages of the drive motor 1 and the battery 2 so that electric power generated by the fuel cell stack 3 is pulled into the drive motor 1 and the battery 2. The DC-DC converter 4 is connected in parallel to the fuel cell stack 3, and boosts the output voltage of the primary-side fuel cell stack 3 and supplies generated electric power to the secondary-side external load 100. The DC-DC converter 4 boosts, for example, an voltage of tens of volts output from the fuel cell stack 3 to a voltage level of several hundred volts so that the external load 100 is supplied with electric power.

The drive motor 1 is connected to both the battery 2 and the DC-DC converter 4 through inverters (not shown). The drive motor 1 is a source of power that drives the vehicle. Furthermore, using a braking force required in a case of braking the vehicle, the drive motor 1 can generate regenerative electric power and charge the battery 2 with this regenerative electric power.

The battery 2 is a power supply source that supplies electric power stored therein to the drive motor 1. In the present embodiment, the battery 2 is a main power supply source, and the fuel cell stack 3 is mainly used for charging the battery 2 when an amount of charge of the battery 2 has become low. Furthermore, the electric power of the fuel cell stack 3 may be supplied to the drive motor 1.

The controller 8 includes a universal electronic circuit including a microcomputer, a microprocessor, or a CPU and peripherals, and executes a specific program, thereby performing a process for controlling the fuel cell system 200 and the external load 100.

The controller 8 receives signals output from a current sensor 9, an accelerator position sensor 10, and other various sensors, and, in response to these signals, acquires an amount of charge remaining in the battery 2, calculates a distance to empty to be described later, and acquires a required running power output. Then, the controller 8 controls respective operating states of the drive motor 1, the fuel cell system 200, etc. on the basis of these acquired or calculated values.

An operation unit (not shown) is connected to the controller 8. The operation unit outputs a start command signal or a stop command signal to cause the fuel cell system 200 to start or stop. The operation unit includes an EV key, and, when the EV key has been turned ON by an occupant, outputs the start command signal to the controller 8, or, when the EV key has been turned OFF, outputs the stop command signal to the controller 8.

In a case where the controller 8 has received the start command signal from the operation unit, the controller 8 performs start operation to cause the fuel cell system 200 to start, and, after completion of the start operation, performs power generation operation to control power generation of the fuel cell stack 3 depending on the operating state of the external load 100. It is to be noted that the fuel cell system 200 may be caused to start when an amount of charge of the battery 2 has reached or dropped below a predetermined value in need of power generation.

In the power generation operation, the controller 8 finds electric power required of the fuel cell stack 3 depending on the operating state of the external load 100. Then, on the basis of the required electric power, the controller 8 calculates respective supply flow rates of cathode gas and anode gas required for power generation of the fuel cell stack 3, and supplies the fuel cell stack 3 with cathode gas and anode gas at the calculated supply flow rates. Then, the controller 8 performs switching control on the DC-DC converter 4 and supplies electric power output from the fuel cell system 200 to the external load 100.

That is, the controller 8 controls the respective flow rates of cathode gas and anode gas on the basis of the electric power required of the fuel cell stack 3, and controls the amount of electric power generated by the fuel cell stack 3. For example, the electric power required of the fuel cell stack 3 increases with an increase in the accelerator pedal depression amount. Thus, the larger the accelerator pedal depression amount, the higher the respective supply flow rates of cathode gas and anode gas supplied to the fuel cell stack 3. It is to be noted that the cathode gas supplied to the fuel cell stack 3 may be controlled on the basis of a deviation between a target temperature and an actual temperature of the fuel cell stack 3. In a case where the actual temperature is higher than the target temperature, when the deviation is large, the supply of cathode gas is increased as compared with when the deviation is small.

Furthermore, in a state where the EV key is ON and in a system state where power supply from the fuel cell system 200 to the external load 100 is shut off, the controller 8 performs self-sustaining operation to suppress power generation of the fuel cell stack 3 and maintain the fuel cell in a state fitting for power generation. Hereinafter, the system state where power supply from the fuel cell system 200 to the external load 100 is shut off is referred to as an "idling stop (IS) state", and the self-sustaining operation is referred to as "IS operation".

In a case where the electric power required of the fuel cell stack 3 has become a predetermined value, for example, zero, the operation state of the fuel cell system 200 makes transition from power generation operation to IS operation. Then, the controller 8 controls the DC-DC converter 4, and shuts off the power supply from the fuel cell system 200 to the external load 100.

Accordingly, during the IS operation, electric power generated by the fuel cell stack 3 may be supplied to an auxiliary machine provided in the fuel cell system 200, or the electric power may not be supplied from the fuel cell stack 3 to the auxiliary machine.

In a case where the controller 8 has received the stop command signal from the operation unit, the controller 8 performs stop operation to stop the operation of the fuel cell system 200.

FIGS. 2A to 2D are diagrams illustrating types of power supply to the external load 100 in the fuel cell system 200 in a state where the EV key is ON.

Figure 2A:
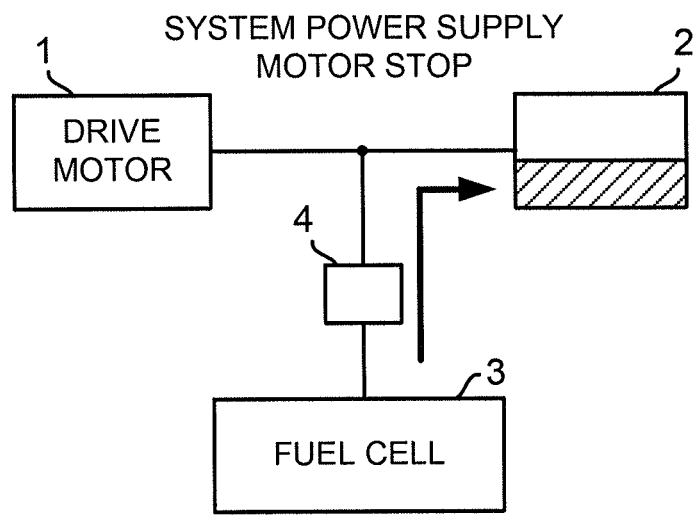
FIG. 2A is a first diagram illustrating a type of power supply from a fuel cell system to an external load.

FIG. 2A is a concept diagram showing a state where the drive motor 1 is stopped and a state where the battery 2 is being supplied with electric power from the fuel cell system 200. The state shown in FIG. 2A is likely to occur when the vehicle is in a stop state, and the amount of charge of the battery 2 is low.

Figure 2B:
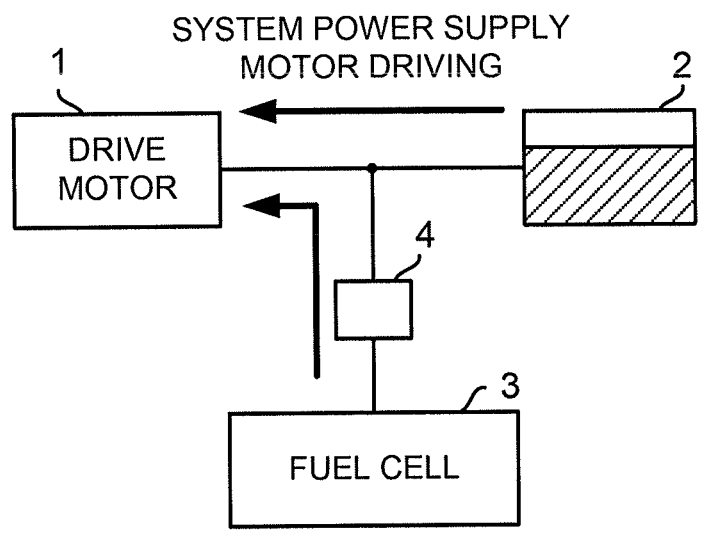
FIG. 2B is a second diagram illustrating a type of power supply from the fuel cell system to the external load.

FIG. 2B is a concept diagram showing a state where the drive motor 1 is in power running and a state where the drive motor 1 is being supplied with electric power from both the fuel cell system 200 and the battery 2. The state shown in FIG. 2B is likely to occur when the vehicle is in an accelerated state, and the load (the power output) of the drive motor 1 is high.

Figure 2C:
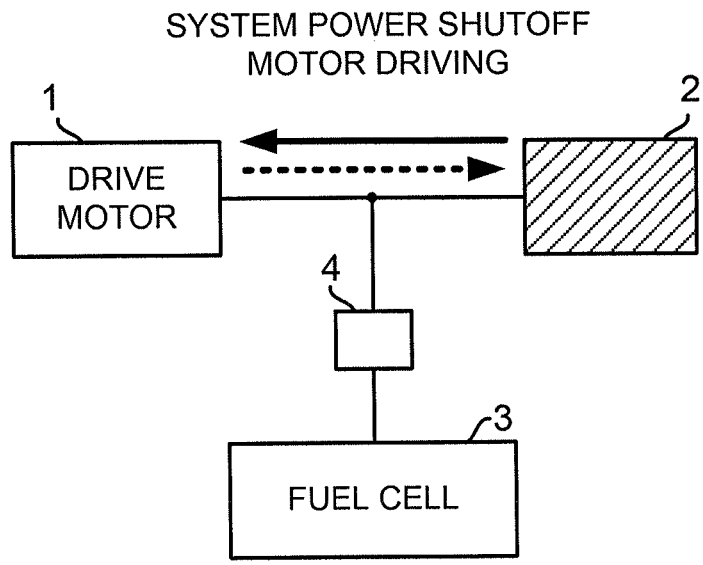
FIG. 2C is a third diagram illustrating a type of power supply from the fuel cell system to the external load.

FIG. 2C is a concept diagram showing a state where the drive motor 1 is in power running or in regeneration and a state where power supply from the fuel cell system 200 to both the drive motor 1 and the battery 2 is shut off. The state shown in FIG. 2C is likely to occur when the drive motor 1 is in a state of being driven at low load or medium load while the vehicle is running, and the battery 2 is fully charged. Furthermore, it is also likely to occur when the vehicle is in a decelerated state, and the capacity of the battery 2 has room to be charged.

Figure 2D:
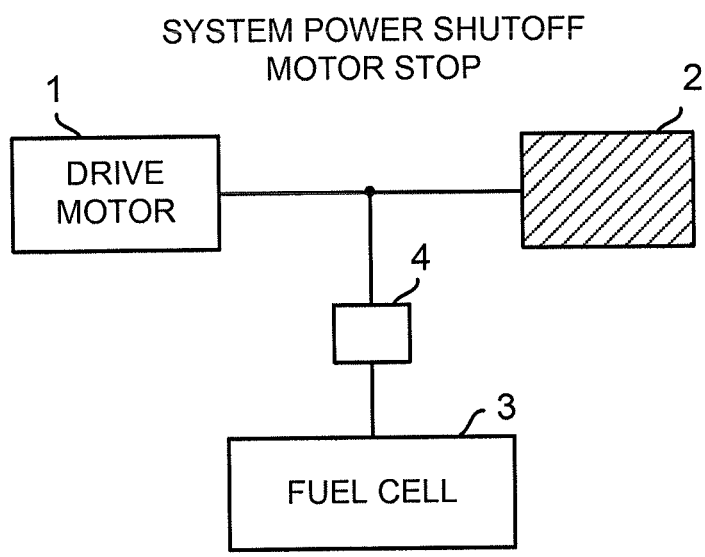
FIG. 2D is a fourth diagram illustrating a type of power supply from the fuel cell system to the external load.

FIG. 2D is a concept diagram showing a state where the drive motor 1 is stopped and a state where the battery 2 is fully charged. The state shown in FIG. 2D is likely to occur when the vehicle is in a stop state, and the battery 2 is fully charged.

In this way, of the states shown in FIGS. 2A to 2D, the states shown in FIGS. 2C and 2D, i.e., a system state where power supply from the fuel cell system 200 to both the drive motor 1 and the battery 2 is shut off falls into the IS state of the fuel cell system 200. When it goes into the IS state, the external load 100 sends an IS operation request to the fuel cell system 200.

Therefore, the fuel cell system 200 may go into the IS state, for example, in a case where the battery 2 has been fully charged by a regeneration operation on the drive motor 1 while the vehicle is running or in a case where the vehicle is running or at a stop with the battery 2 fully charged. In such a case, electric power required of the fuel cell stack 3 is zero, and IS operation is performed.

Subsequently, a method for calculating a distance to empty from the present time, i.e., a total distance to empty is described.

Figure 3:
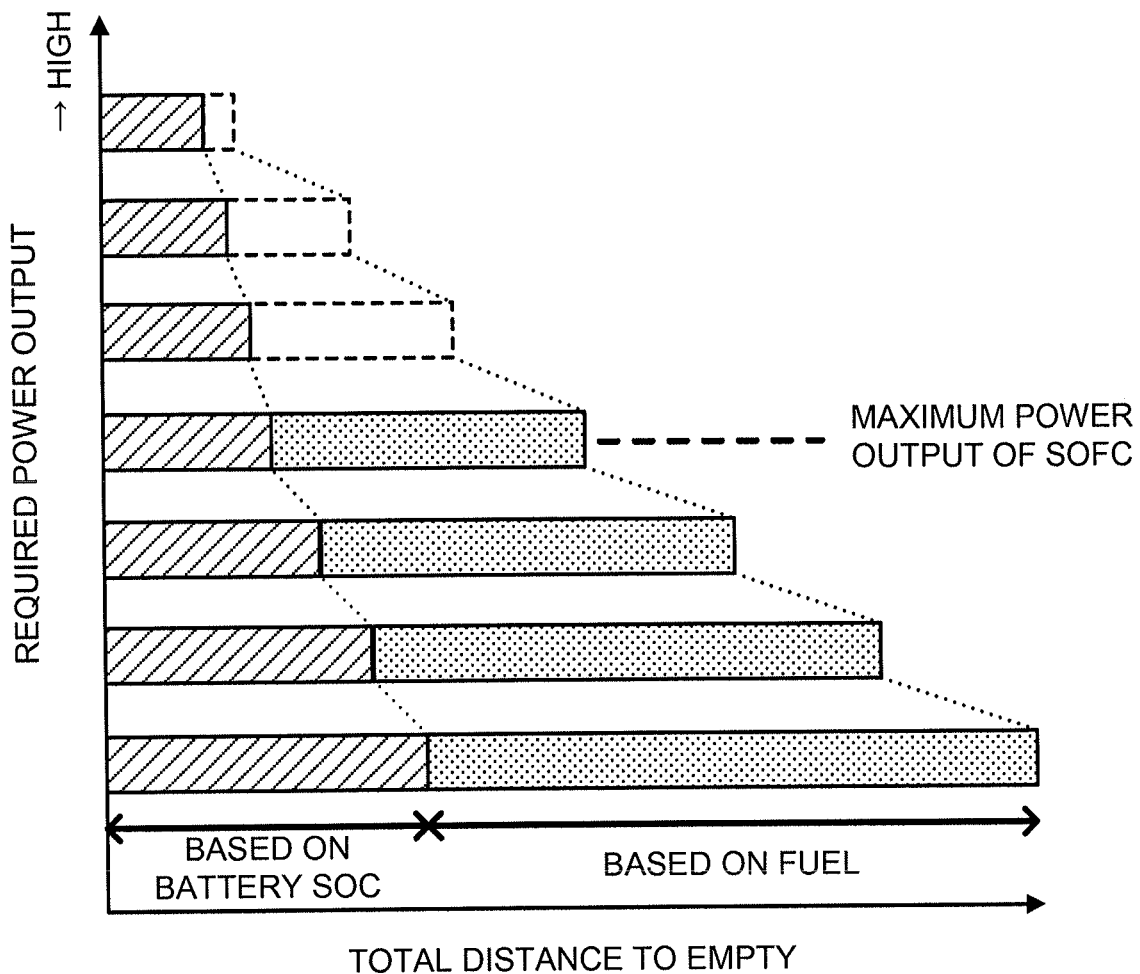
FIG. 3 is a diagram for explaining a relationship between a required power output and a total distance to empty.

FIG. 3 is a diagram for explaining a relationship between a required power output and a total distance to empty. In the drawing, "based on battery SOC" means a distance to empty on electric power of the battery 2, and "based on fuel" means a distance to empty on electric power generated by the fuel cell stack 3.

In the hybrid vehicle according to the present embodiment, electric power that can be used for the vehicle to run is electric power of the battery 2 and electric power generated by the fuel cell stack 3. Then, the higher the required power output, the larger the amount of electric power consumption; thus, a distance to empty based on battery SOC and a distance to empty based on fuel become shorter. Therefore, it is thought that a total distance to empty can be accurately estimated by adding the distance to empty based on battery SOC and the distance to empty based on fuel.

However, as described below, in the above-described calculation method, a calculated value may be incorrect as an estimate of the total distance to empty.

The SOFC used as the fuel cell stack 3 has a characteristic of generating a large amount of heat during operation. Considering suppression of thermal expansion of a stacked cell, etc. associated with power generation of the fuel cell stack 3, it is not desirable to increase the number of cells stacked excessively. Thus, the fuel cell stack 3 used in the present embodiment is the one whose generating power output is a low power output of about 10 to 20 kW.

Meanwhile, a power output required when the vehicle runs (also referred to as a "required running power output" or as a "vehicle required power output", or simply as a "required power output") is equal to or less than the above-described generating power output on low-load running such as a case of running in a city area. However, on high-load running such as a case of running on an expressway, a vehicle required power output is higher than the generating power output of the fuel cell stack 3.

Accordingly, if all of electric power of the battery 2 has been used up, for example, in the middle of high-load running, it takes more than the fuel cell stack 3 to generate the vehicle required power output, thus it is not possible to continue the high-load running. That is, in a region where a required power output is higher than the maximum power output of the SOFC in FIG. 3, a distance to empty based on fuel indicated by a broken line becomes a distance to empty on a power output lower than the required power output.

Therefore, a value obtained by simply adding a distance to empty based on battery SOC and a distance to empty based on fuel becomes a value diverging from an actual distance to empty on the required power output, and thus is not correct as an estimate of a total distance to empty.

Accordingly, in the present embodiment, to accurately estimate a total distance to empty even in a case where a required power output is higher than the maximum power output of the SOFC, the following control is performed.

It is to be noted that in the above description, high-load running is described as an example of an operation state where a total distance to empty obtained by adding a distance to empty based on battery SOC and a distance to empty based on fuel is not correct; however, it is not limited to this. For example, when the fuel cell stack 3 is in a cooled state, the generating power output is limited, thereby it may take more than the fuel cell stack 3 to fulfill the required power output even if the vehicle is not on high-load running.

Figure 4:
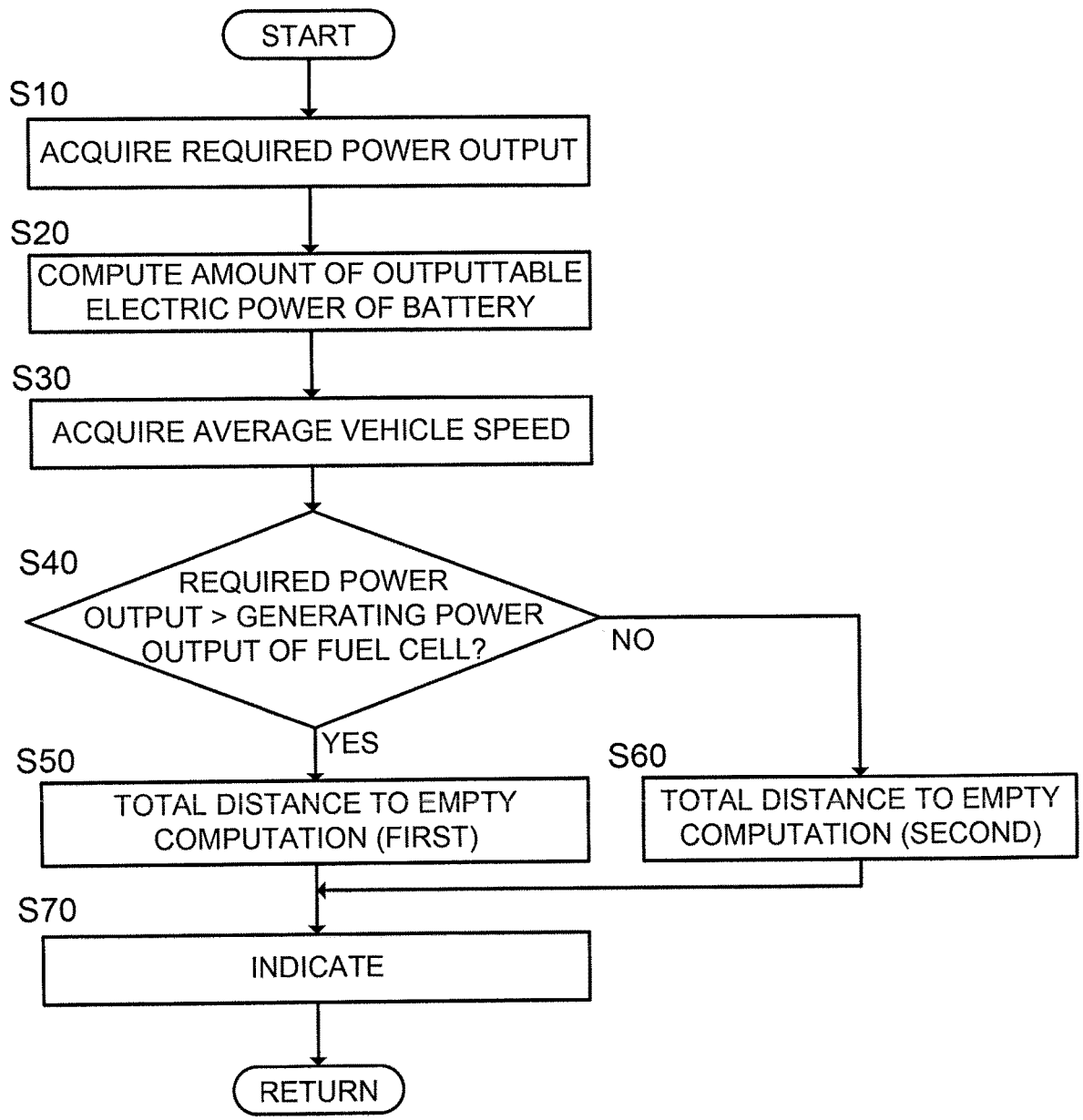
FIG. 4 is a flowchart showing a control routine to estimate a total distance to empty according to a first embodiment.

FIG. 4 is a flowchart showing a control routine to estimate a total distance to empty in the present embodiment. This control routine is repeatedly executed by the controller 8, for example, at intervals of about a few milliseconds. It is to be noted that it is in a state where a start-up operation on the fuel cell stack 3 has been finished when this control routine is executed.

In the present embodiment, as described below, respective total distances to empty in a case where a required power output is higher than the generating power output of the fuel cell stack 3 and a case where a required power output is lower than the generating power output of the fuel cell stack 3 are calculated by different methods.

At Step S10, the controller 8 acquires a required power output. A method of acquiring the required power output may be any of the following methods.

A first method is a method of calculating a power output that the driver requires, for example, by map retrieval or the like on the basis of a running state, i.e., a detection value of the accelerator position sensor 10 and a detection value of a vehicle speed sensor (not shown) and setting this calculated power output as a required power output.

A second method is a method of using an average value calculated on the basis of accumulated past running data. For example, changes of a required power output over the last one hour are accumulated as running data, and an average value of these is set as a required power output. It is to be noted that a period for which running data is accumulated is not limited to the last one hour, and various settings, for example, such as the last 30 minutes and a period from the start of a trip this time until the present, can be made.

A third method is a method of using a preset value. For example, a typical required power output in each running state is set in advance, and a required power output to be used is determined on the basis of the current running state.

A fourth method is a method of using a required power output in a case of high-load running regardless of the current running state. In this method, it is necessary to set the required power output in the case of high-load running in advance.

A fifth method is a method of using a required power output in a case of low-load running regardless of the current running state. In this method, it is necessary to set the required power output in the case of low-load running in advance.

A sixth method is a method of implementing both of the fourth and fifth methods.

It is to be noted that at Step S10, the driver may select one from the first to sixth methods, and a required power output may be acquired by the selected method.

At Step S20, the controller 8 calculates an amount of outputtable electric power of the battery that is an amount of electric power which can be output on an amount of charge remaining in the battery 2. A method of the calculation may be a method of performing a computation using an equation where an amount of charge remaining (hereinafter, also referred to as an "SOC") of the battery 2 is used as a parameter, or may be a method of mapping a relationship between an SOC and an amount of outputtable electric power of the battery 2 in advance and retrieving this.

It is to be noted that an SOC of the battery 2 may be acquired, for example, by causing the current sensor 9 to detect values of currents output and input to the battery 2 and adding up the values, or may be acquired by other existing techniques.

At Step S30, the controller 8 acquires an average vehicle speed. The average vehicle speed here is an average value of vehicle speed in a case of running on the required power output acquired at Step S10. A computation using an equation where the required power output is used as a parameter may be performed; alternatively, a relationship between a required power output and an average vehicle speed may be mapped in advance, and this may be retrieved.

At Step S40, the controller 8 determines whether or not the required power output is higher than the generating power output of the fuel cell stack 3. The generating power output used here is basically the maximum generating power output of the fuel cell stack 3; however, for example, in a case where the generating power output of the fuel cell stack 3 is limited for a reason such as the fuel cell stack 3 being in a cold state, a limited value is used.

In a case where a result of the determination is yes, the controller 8 performs a first total distance to empty computation at Step S50, and, in a case where a result of the determination is no, performs a second total distance to empty computation at Step S60. The first and second total distance to empty computations are described later.

Then, at Step S70, the controller 8 indicates a total distance to empty found by the computation at Step S50 or S60 to the driver. A place to indicate can be any place as long as the driver can visually recognize it. It is to be noted that not only is the total distance to empty simply indicated, but also what a running state the vehicle is in through the total distance to empty may be indicated as well. For example, in a case where the required power output is acquired by any of the first to third methods at Step S10, the controller 8 indicates it is the distance to empty when the vehicle runs while maintaining the current running state. Furthermore, in a case where the required power output is acquired by any of the fourth to sixth methods at Step S10, the controller 8 indicates it is either the high-load distance to empty or the low-load distance to empty. By indicating these, the driver can utilize the total distance to empty more effectively.

Here, the first total distance to empty computation is described.

As described above, in a case where the required power output is higher than the generating power output of the fuel cell stack 3, if the battery 2 has no charge remaining, i.e., if all of outputtable electric power of the battery 2 has been used up, the vehicle cannot run on the required power output even if there is some fuel left. In other words, as long as an excess of the required power output with respect to the generating power output of the fuel cell stack 3 is covered by the amount of outputtable electric power of the battery 2, the vehicle can run on the required power output. That is, a running distance until the amount of outputtable electric power of the battery 2 has been used up by the excess of the required power output with respect to the generating power output of the fuel cell stack 3 becomes a total distance to empty. This is represented by Equation (1), $$L\text{total} = W\text{bat}[kWh] \div (F[kW] - P[kW]) \times V\text{ave}[km/h] \quad (1)$$

where Ltotal denotes a total distance to empty; Wbat denotes an amount of outputtable electric power of the battery; F denotes a required power output; P denotes a generating power output of the fuel cell; and Vave denotes an average vehicle speed.

For example, if the average vehicle speed when the required power output is 20 [kW], the generating power output of the fuel cell is 15 [kW], the current amount of outputtable electric power of the battery is 10 [kWh], and the required power output is 20 [kW] is 100 [km/h], Equation (1) is solved as follows.

$$L\text{total} = 10 \ [kWh] \div (20 \ [kW] - 15 \ [kW]) \times 100 \ [km/h]$$
$$= 2 \ [h] \times 100 \ [km/h]$$
$$= 200 \ [km]$$

It is to be noted that the generating power output of the fuel cell depends on a specification of the fuel cell stack 3, and, if the required power output is determined, an average vehicle speed is also determined. Accordingly, the computation of Equation (1) is performed by substituting various values for the amount of outputtable electric power of the battery and the required power output, and a map of total distances to empty is created on the basis of results of the computation in advance, and then a total distance to empty can be found by map retrieval using the acquired amount of outputtable electric power of the battery and the acquired required power output. Finding the total distance to empty by map retrieval shall also be included in "calculate".

Next, the second total distance to empty computation is described.

The second total distance to empty computation is the calculation method of the above-described patent document. That is, it is a method of adding a distance to empty calculated on the basis of an amount of charge remaining in the battery 2 and a distance to empty calculated on the basis of electric power (hereinafter, also referred to as an "amount of remaining fuel electric power") obtained by using all the amount of fuel remaining in the fuel tank to drive the fuel cell stack 3 to generate. This is represented by Equation (2).

$$L\text{total} = (W\text{bat}[kWh] + W\text{fuel}[kWh]) \div F[kW] \times V\text{ave}[km/h] \quad (2)$$

where Ltotal denotes a total distance to empty; Wbat denotes an amount of outputtable electric power of the battery; Wfuel denotes an amount of remaining fuel electric power; F denotes a required power output; and Vave denotes an average vehicle speed.

If a required power output is equal to or lower than the generating power output of the fuel cell stack 3, the vehicle can run according to the required power output even after the battery 2 has run out of power; therefore, a correct total distance to empty can be calculated even by the calculation method of the above-described patent document. Accordingly, the calculation method of the above-described patent document is used as the second total distance to empty computation.

As with the first total distance to empty, the second total distance to empty computation may also be calculated by map retrieval. In this case, parameters used in the map retrieval are an amount of outputtable electric power of the battery, a required power output, and an amount of remaining fuel electric power. It is to be noted that in the following description, a total distance to empty calculated by the second total distance to empty computation is also referred to as a "second total distance to empty".

FIGS. 5 and 6 are diagrams showing an example of a total distance to empty (hereinafter, also referred to as a "first total distance to empty") calculated by the first total distance to empty computation. In the drawings, a total distance to empty calculated by the calculation method of the above-described patent document in a case where a required power output is higher than the generating power output of the fuel cell is shown as a comparative example.

In FIG. 5, the amount of outputtable electric power of the battery is 10 [kWh]; the amount of remaining fuel electric power is 80 [kWh]; and required power outputs are 20 [kW], 25 [kW], and 30 [kW]. In FIG. 6, the amount of outputtable electric power of the battery is 10 [kWh]; the amount of remaining fuel electric power is 40 [kWh]; and required power outputs are 20 [kW], 25 [kW], and 30 [kW]. In both of FIGS. 5 and 6, the generating power output of the fuel cell stack 3 is 15 [kW] that is the maximum generating power output.

Comparing the first total distance to empty and the total distance to empty calculated by the calculation method of the comparative example, the total distance to empty in the comparative example is generally longer. Then, the higher the required power output, the larger the error between the two. As described above, the total distance to empty of the comparative example includes a distance to empty based on fuel that the vehicle actually cannot run according to the required power output. Therefore, in the calculation method of the comparative example, as a total distance to empty, a distance longer than an actual distance to empty is indicated to the driver, and a divergence between an actual total distance to empty and the indicated total distance to empty becomes larger as the required power output becomes higher.

In contrast, the first total distance to empty does not include a distance to empty based on fuel that the vehicle actually cannot run according to the required power output; therefore, the control routine in the present embodiment makes it possible to indicate a correct total distance to empty to the driver.

As described above, in the present embodiment, in a case where a required power output is higher than the generating power output of the fuel cell stack 3, a total distance to empty based on a shortage of the generating power output of the fuel cell stack 3 (the electric generator) with respect to the required running power output and an amount of charge remaining in the battery 2 is calculated. Thus, it is possible to correctly calculate the total distance to empty even in a case where the required power output is higher than the generating power output of the fuel cell stack 3.

Furthermore, in the present embodiment, the generating power output of the fuel cell stack 3 used in calculation of a total distance to empty may be set to the maximum generating power output of the fuel cell stack 3. In a case where a required power output exceeds the generating power output of the fuel cell stack 3, if the battery 2 has run out of power, the vehicle cannot run according to the required power output even if there is some fuel left; however, the higher the generating power output of the fuel cell stack 3, the larger the amount of fuel consumption. That is, by setting the generating power output of the fuel cell stack 3 used in calculation of a total distance to empty to the maximum generating power output, a total distance to empty in a case of effectively using an amount of fuel remaining can be calculated.

Moreover, in the present embodiment, the required power output can be set to a value calculated on the basis of past running data. In this case, a total distance to empty according to the driver's actual driving characteristics can be calculated.

Furthermore, in the present embodiment, the required power output can be set to a typical required running power output in each running state stored in advance. In this case, a total distance to empty according to a general running situation can be calculated.

Moreover, in the present embodiment, the required power output can be set to a value at the time of high-load running. According to this, for example, when the vehicle runs on an expressway, a total distance to empty based on the actual circumstances can be calculated.

Furthermore, in the present embodiment, the required power output can be set to a value at the time of low-load running. According to this, for example, when the vehicle runs on an ordinary road, a total distance to empty based on the actual circumstances can be calculated.

Moreover, in the present embodiment, the calculated total distance to empty is indicated to the driver. This enables the driver to recognize the total distance to empty.

Furthermore, in the present embodiment, the driver may select any of the above-described various required power outputs, and a total distance to empty may be calculated on the basis of the selected required running power output, and then a result of the calculation may be indicated to the driver. In this case, a total distance to empty according to the driver's running intention is calculated, and the driver can recognize the total distance to empty.

Moreover, in the present embodiment, a high-load total distance to empty may be calculated on the basis of a required power output in a case of high-load running, and a low-load total distance to empty may be calculated on the basis of a required power output in a case of low-load running, and then the high-load total distance to empty and the low-load total distance to empty may be indicated to the driver. In this case, the driver can recognize a difference in the distance to empty due to a difference in running load.

Second Embodiment

A hybrid vehicle of the present embodiment has a system configuration similar to that of the first embodiment; however, the present embodiment differs from the first embodiment in some of a control routine to calculate and indicate a total distance to empty. In the following, differences are mainly described. It is to be noted that the control routine of the present embodiment is also executed in a state where the start-up operation on the fuel cell stack 3 has been finished, as with the first embodiment.

Figure 7:
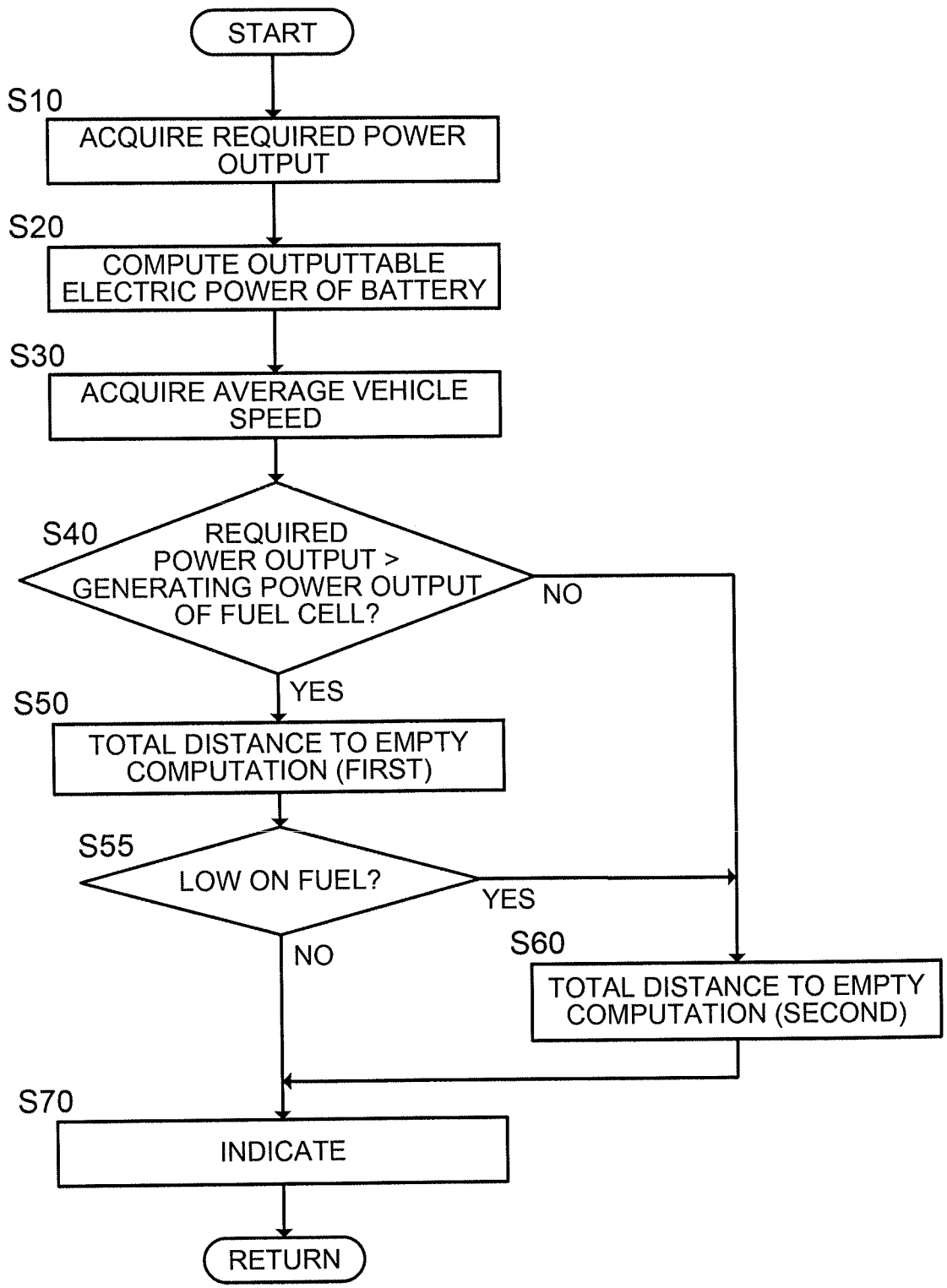
FIG. 7 is a flowchart showing a control routine to estimate a total distance to empty according to a second embodiment.

FIG. 7 is a flowchart showing the control routine to estimate a total distance to empty in the present embodiment. This control routine is repeatedly executed by the controller 8, for example, at intervals of about a few milliseconds. The control routine in FIG. 7 differs from the control routine in FIG. 4 in that after the controller 8 performs the first total distance to empty computation (Step S50), determination of whether or not the amount of fuel remaining in the fuel tank is short with respect to the amount required to run the first total distance to empty (Step S55) is performed.

The first total distance to empty computation is based on the premise that the fuel cell stack 3 continues being supplied with fuel during the period of running this distance. For example, as with the first embodiment, assume that the average vehicle speed when the required power output is 20 [kW], the generating power output of the fuel cell is 15 [kW], the current amount of outputtable electric power of the battery is 10 [kWh], and the required power output is 20 [kW] is 100 [km/h]. In this case, if an equation is modified as with the first embodiment, it allows for two-hour running at an average vehicle speed of 100 [km/h], thus a first total distance to empty results in 200 [km]. That is, a first total distance to empty of 200 [km] is a value based on the assumption that fuel lasts two hours.

However, for example, in a case where the rate of fuel consumption when a generating power output of the fuel cell stack 3 in Equation (1) is generated is 5 [L/h], and the amount of fuel remaining is 5 [L], the fuel cell stack 3 runs out of fuel in an hour, and thus the vehicle cannot run 200 [km].

Accordingly, the controller 8 determines whether or not the amount of fuel remaining in the fuel tank is short with respect to the amount required to run the first total distance to empty at Step S55. Specifically, first, the controller 8 calculates a time until there is no amount of fuel remaining from the rate of fuel consumption of the fuel cell stack 3 and the amount of fuel remaining. It is to be noted that the controller 8 has stored the rate of fuel consumption for each generating power output of the fuel cell stack 3 in advance. Furthermore, the amount of fuel remaining is detected by a publicly known method. For example, a fuel sensor is provided in the fuel tank 7 to detect the amount of fuel remaining.

Then, the controller 8 compares a time until no fuel is left with a possible running time calculated in the course of the first total distance to empty computation, and determines that it is short of fuel if the time until no fuel is left is shorter.

FIG. 8 is a diagram that compares the first total distance to empty and the second distance to empty. The amount of outputtable electric power of the battery is 10 [kWh]; the amount of remaining fuel electric power is 15 [kWh]; and the required power outputs are 20 [kW], 25 [kW], and 30 [kW]. The amount of remaining fuel electric power is 15 [kW], which means the amount of fuel remaining is 5 [L].

As described in the first embodiment, in a case where the required power output is higher than the generating power output of the fuel cell stack 3, the first total distance to empty computation can calculate a value closer to an actual distance to empty than the second total distance to empty computation. However, in FIG. 8, in a case where the required power output is 20 [kW], the first total distance to empty is 200 [km]; however, as described above, in reality, the vehicle cannot run 200 [km] due to a shortage of fuel. That is, the assumption of the first total distance to empty computation that fuel lasts falls apart, thus the accuracy of the first total distance to empty becomes worse than the second total distance to empty.

Accordingly, if a result of the determination at Step S55 is yes, the controller 8 performs the second total distance to empty computation at Step S60.

If a result of the determination is no, which means the vehicle can run the first total distance to empty, thus the controller 8 indicates the first total distance to empty at Step S70.

As described above, in the present embodiment, in a case where a time until there is no more fuel for putting the fuel cell stack 3 into operation is shorter than a time until the battery 2 has run out of power that can be used for the vehicle to run, the sum of a distance to empty determined by an amount of charge remaining in the battery 2 and a distance to empty determined by an amount of electric power obtained by using all the amount of fuel remaining to generate is set as a total distance to empty. According to this, in a case where the vehicle actually cannot run the first total distance to empty because it runs out of fuel earlier than electric power of the battery 2, a total distance to empty with higher accuracy than the first total distance to empty can be calculated.

It is to be noted that the fuel tank 7 is generally provided with a fuel sensor that detects an amount of fuel remaining to indicate the detected amount of fuel remaining to the driver. Then, in general, the driver refuels the vehicle if the amount of fuel remaining becomes low. Therefore, a situation in which the vehicle has run out of the amount of fuel remaining earlier than electric power of the battery 2 is less likely to occur.

Third Embodiment

In the first and second embodiments, there is described the control routine to calculate a total distance to empty in a state where the start-up operation on the fuel cell stack 3 has been finished; however, in the present embodiment, there is described a control routine that can accurately calculate a total distance to empty even in a state where the fuel cell stack 3 is not in operation.

A hybrid vehicle to which the present embodiment is applied has a system configuration similar to the configuration of the first embodiment. In a situation where the fuel cell stack 3 is not in operation, this hybrid vehicle runs on only electric power of the battery 2. Furthermore, the fuel cell stack 3 used in the present embodiment is an SOFC; an SOFC takes more than a few tens of minutes between the start of the start-up operation and the end of the start-up operation.

Therefore, in a case where a total distance to empty is estimated in a state where the start-up operation on the fuel cell stack 3 has not been finished, it is necessary to consider that an SOC of the battery 2 and an amount of fuel remaining change in a time between the start of the start-up operation and the end of the start-up operation. Accordingly, in the present embodiment, a total distance to empty shall be estimated in consideration of the above-described changes.

Figure 9:
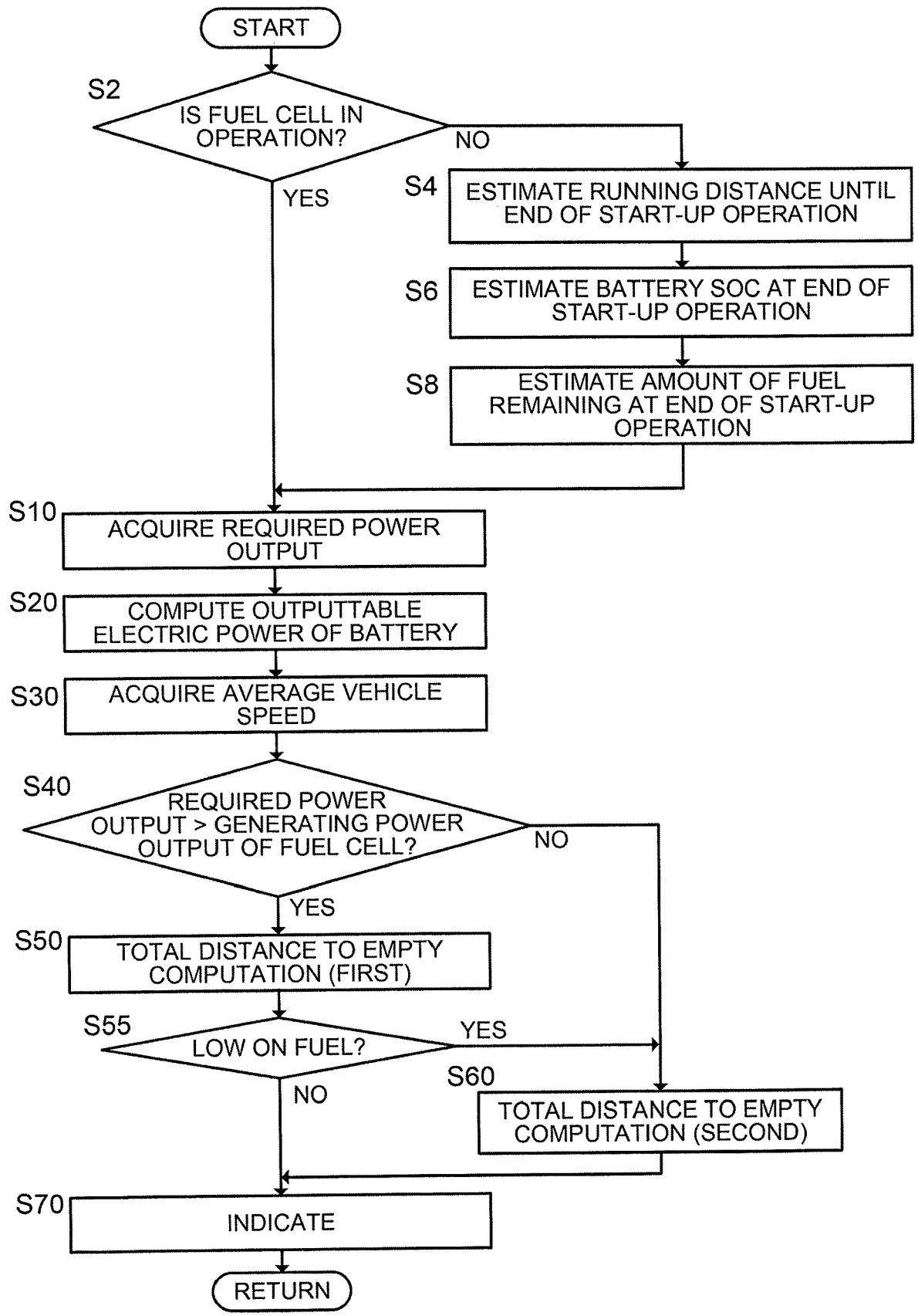
FIG. 9 is a flowchart showing a control routine to estimate a total distance to empty according to a third embodiment.

FIG. 9 is a flowchart showing the control routine to estimate a total distance to empty in the present embodiment. As described below, in a case where the fuel cell stack 3 is not in operation, the controller 8 calculates a total distance to empty by adding a running distance until the end of the start-up operation and a distance to empty after the end of the start-up operation. It is to be noted that this control routine is repeatedly executed by the controller 8, for example, at intervals of about a few milliseconds. Steps S10 to S70 are the same as the control routine shown in FIG. 7 according to the second embodiment.

In FIG. 9, before the process at Step S10 is performed, below-described processes at Steps S2 to S8 are performed.

At Step S2, the controller 8 determines whether or not the fuel cell stack 3 is in operation, and, in a case where the fuel cell stack 3 is in operation, performs the processes at Steps S10 and onward described in the second embodiment.

In a case where the controller 8 has determined that the fuel cell stack 3 is not in operation at Step S2, at Step S4, the controller 8 estimates a running distance until the end of the start-up operation. Specifically, the controller 8 stores therein a time taken between the start and the end of the start-up operation on the fuel cell stack 3 in advance, and estimates a running distance until the end of the start-up operation from this time and the above-described average vehicle speed.

At Step S6, the controller 8 estimates an SOC of the battery 2 at the end of the start-up operation. Specifically, the controller 8 calculates an amount of electric power consumed by running of the distance estimated at Step S2, and estimates an SOC of the battery 2 at the end of the start-up operation from this amount of electric power and a current SOC of the battery 2.

At Step S8, the controller 8 estimates an amount of fuel remaining at the end of the start-up operation. Specifically, the controller 8 calculates an amount of fuel consumed in a time between the start of the start-up operation and the end of the start-up operation, and estimates an amount of fuel remaining at the end of the start-up operation from this amount of fuel and a current amount of fuel remaining.

When having finished the process at Step S8, the controller 8 performs the processes at Steps S10 and onward. At that time, at Step S20, the controller 8 calculates an amount of outputtable electric power of the battery that is an amount of electric power which can be output in the battery SOC estimated at Step S6. At Step S50, the controller 8 sets a value obtained by adding the value calculated in the above-described first total distance to empty computation and the running distance until the end of the start-up operation as a first total distance to empty. At Step S60, the controller 8 calculates a total distance to empty by using Wfuel, an amount of remaining fuel electric power, in Equation (2) as an amount of electric power generated from the amount of fuel remaining at the end of the start-up operation, and sets a value obtained by adding this calculated value and the running distance until the end of the start-up operation as a second total distance to empty.

As described above, in the present embodiment, in a case where the fuel cell stack 3 is not in operation, the controller 8 estimates, on the basis of the required power output, the running distance until the start-up operation on the fuel cell stack 3 has been finished, and the amount of charge remaining in the battery 2 and the amount of fuel remaining at the point of time when the start-up operation has been finished. Then, the controller 8 performs the first total distance to empty computation or the second total distance to empty computation on the basis of the estimate of the amount of charge remaining in the battery 2 and the estimate of the amount of fuel remaining at the point of time when the start-up operation has been finished, thereby calculating a total distance to empty after the end of the start-up operation. The controller 8 sets the sum of the total distance to empty after the end of the start-up operation and the running distance until the start-up operation has been finished as a total distance to empty. Accordingly, in a case where the fuel cell stack 3 is not in operation, the controller 8 can calculate a correct total distance to empty according to change in the SOC of the battery 2 and change in the amount of fuel remaining while waiting for the end of the start-up operation.

It is to be noted that in the first to third embodiments, there is described the case where the electric generator is the fuel cell system 200; however, it is not limited to this. For example, these embodiments are also applicable to a case where a system including an internal-combustion engine and an electric generator driven by the internal-combustion engine to generate electric power is used instead of the fuel cell system 200. Because in a case where a generating power output of the electric generator driven by the internal-combustion engine to generate electric power is lower than a required power output, there are problems similar to the problems solved in the first to third embodiments. Furthermore, a time between the start and the end of the start-up operation that the internal-combustion engine takes is greatly shorter than an SOFC, and an amount of change in the SOC of the battery 2 and changes in the amount of fuel remaining in the time between the start and the end of the start-up operation are negligible.

The embodiments of the present invention are described above; however, the above-described embodiments represent only some of application examples of the present invention, and are not intended to limit the technical scope of the present invention to the specific configurations thereof.

The invention claimed is:

1. A total distance to empty informing device provided in a hybrid vehicle that is caused to run by a motor driven by electric power of a battery and electric power generated by an electric generator, the device comprising:
   a sensor detecting a state of charge of the battery;
   a display device; and
   a programmable controller programmed to:
      acquire a required running power output;
      calculate an average vehicle speed from the required running power output;
      determine an electric power amount that the battery can output from the state of charge of the battery;
      determine whether or not the required running power output is greater than a generating power output of the electric generator; and
      when the required running power output is greater than the generating power output of the electric generator:
         calculate a shortage of the generating power output of the electric generator with respect to the required running power output;
         calculate a time by dividing the electric power amount that the battery can output by the shortage;
         calculate a first distance to empty by multiplying the time and the average vehicle speed, and
         control the display device to display the first distance to empty as a total distance to empty.

2. The total distance to empty informing device according to claim 1, wherein the generating power output is a maximum generating power output of the electric generator.

3. The total distance to empty informing device according to claim 1, wherein the controller is further programmed to:
   perform a determination as to whether or not a time until there is no more fuel used to drive the electric generator is shorter than a time until the battery has run out of power that the hybrid vehicle is able to use to run, and
   when the determination is affirmative:
      set a sum of a distance to empty determined from the state of charge and a distance to empty determined from an amount of electric power obtained by using all of a remaining amount of fuel to generate as a second distance to empty, and
      control the display device to display the second distance to empty as the total distance to empty.

4. The total distance to empty informing device according to claim 3, wherein the controller is further programmed to:
  determine whether or not the electric generator is in operation; and
  when the electric generator is not in operation;
    calculate a running distance until end of a start-up operation of the electric generator on a basis of the average vehicle speed and a time required for a start-up operation of the electric generator;
    estimate the state of charge of the battery and a remaining amount of fuel at the end of the start-up operation on a basis of the required running power output;
    calculate a sum of a distance to empty determined from the state of charge at the end of the start-up operation and a distance to empty determined from the remaining amount of the fuel at the end of the start-up operation; and
    calculate the second distance to empty by adding the running distance until the end of the start-up operation to the sum of the distances to empty.

5. The total distance to empty informing device according to claim 1, wherein the controller is further programmed to:
  determine whether or not the electric generator is in operation; and
  when the electric generator is not in operation:
    calculate a running distance until end of a start-up operation of the electric generator on a basis of the average vehicle speed and a time required for a start-up operation of the electric generator;
    estimate the state of charge of the battery and a remaining amount of fuel at the end of the start-up operation on the electric generator on a basis of the required running power output;
    calculate a distance to empty after the end of the start-up operation on a basis of the shortage of the generating power output with respect to the required running power output and the state of charge of the battery at the end of the start-up operation; and
    set a sum of the running distance until the end of the start-up operation and the distance to empty after the end of the start-up operation as the first distance to empty.

6. The total distance to empty informing device according to claim 1, wherein the required running power output is a value calculated on a basis of past running data.

7. The total distance to empty informing device according to claim 1, wherein the required running power output is a required running power output in each running state that has been stored in advance.

8. The total distance to empty informing device according to claim 1, wherein the required running power output is a value at a time of high-load running.

9. The total distance to empty informing device according to claim 1, wherein the required running power output is a value at a time of low-load running.

10. The total distance to empty informing device according to claim 1, wherein the hybrid vehicle is driven by a driver, and the controller is further programmed to:
  acquire the required running power output by causing the driver to select any one of a value calculated on a basis of past running data, a required running power output in each running state that has been stored in advance, a value at a time of high-load running, or a value at a time of low-load running as the required running power output.

11. The total distance to empty informing device according to claim 1, wherein the hybrid vehicle is driven by a driver, and the controller is further programmed to:
  calculate the first distance to empty as a high-load first distance to empty on a basis of the required running power output in a case of high-load running;
  calculate the first distance to empty as a low-load first distance to empty on a basis of the required running power output in a case of low-load running; and
  control the display device to display the high-load first distance to empty and the low-load first distance to empty.

* * * * *